(12) United States Patent
Lee et al.

(10) Patent No.: US 12,108,345 B2
(45) Date of Patent: Oct. 1, 2024

(54) METHOD FOR TRANSMITTING/RECEIVING UPLINK DATA, AND DEVICE THEREFOR

(71) Applicant: LG ELECTRONICS INC., Seoul (KR)

(72) Inventors: Jeongsu Lee, Seoul (KR); Kijun Kim, Seoul (KR); Sukhyon Yoon, Seoul (KR); Hyunsoo Ko, Seoul (KR); Hyunsu Cha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 657 days.

(21) Appl. No.: 17/615,360

(22) PCT Filed: Dec. 13, 2019

(86) PCT No.: PCT/KR2019/017670
§ 371 (c)(1),
(2) Date: Nov. 30, 2021

(87) PCT Pub. No.: WO2020/122661
PCT Pub. Date: Jun. 18, 2020

(65) Prior Publication Data
US 2022/0240194 A1  Jul. 28, 2022

(30) Foreign Application Priority Data
Dec. 13, 2018 (KR) .................. 10-2018-0160503

(51) Int. Cl.
*H04W 4/00* (2018.01)
*H04W 52/14* (2009.01)
(Continued)

(52) U.S. Cl.
CPC ....... *H04W 52/243* (2013.01); *H04W 52/146* (2013.01); *H04W 52/242* (2013.01); *H04W 52/367* (2013.01)

(58) Field of Classification Search
CPC ............. H04W 52/243; H04W 52/146; H04W 52/242; H04W 52/367; H04W 52/247
See application file for complete search history.

(56) References Cited

U.S. PATENT DOCUMENTS 9,042,937 B2 * 5/2015 Zhang .................. H04W 52/08
455/450

FOREIGN PATENT DOCUMENTS

| CN | 104349438 B | * 11/2018 | .......... H04W 52/146 |
| KR | 10-2010-0122340 | 11/2010 | |

(Continued)

OTHER PUBLICATIONS

PCT International Application No. PCT/KR2019/017670, Written Opinion of the International Searching Authority dated Mar. 31, 2020, 16 pages.

(Continued)

*Primary Examiner* — Omoniyi Obayanju
(74) *Attorney, Agent, or Firm* — LEE, HONG, DEGERMAN, KANG & WAIMEY

(57) ABSTRACT

The present specification relates to a wireless communication system and, particularly, to a method for controlling the power of a terminal, and a device therefor, the method comprising: receiving, from a serving cell, serving cell-related transmission power information and adjacent cell-related interference information; and determining uplink transmission power on the basis of the serving cell-related transmission power information and the adjacent cell-related interference information, wherein the uplink transmission power is determined on the basis of a minimal value from among (1) maximum transmission power of a terminal, (2) transmission power based on the serving cell-related transmission power information, and (3) maximum allowable interference power based on the adjacent cell-related interference information, and an uplink signal is transmitted to (Continued)

the serving cell on the basis of the uplink transmission power. The terminal communicates with at least one from among a mobile terminal, a network, and an autonomous vehicle excluding a vehicle that includes the terminal.

15 Claims, 11 Drawing Sheets

(51) Int. Cl.
*H04W 52/24* (2009.01)
*H04W 52/36* (2009.01)

(56) References Cited

FOREIGN PATENT DOCUMENTS

| KR | 10-2011-0091093 | 8/2011 |
|----|-----------------|--------|
| KR | 10-2012-0084598 | 7/2012 |

OTHER PUBLICATIONS

Alcatel-Lucent Shanghai Bell et al., "Uplink Power Control Enhancement for Small Cell Enhancements", R1-132982, 3GPP TSG RAN WG1 Meeting #74, Aug. 2013, 6 pages.
NTT Docomo, "Performance of Uplink Multi-point Power Control", R1-132363, 3GPP TSG RAN WG1 Meeting #73, May 2013, 5 pages.

* cited by examiner

【Fig. 1】
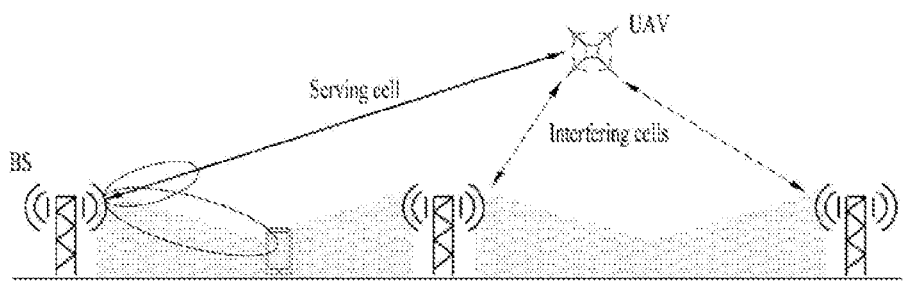
【Fig. 2】
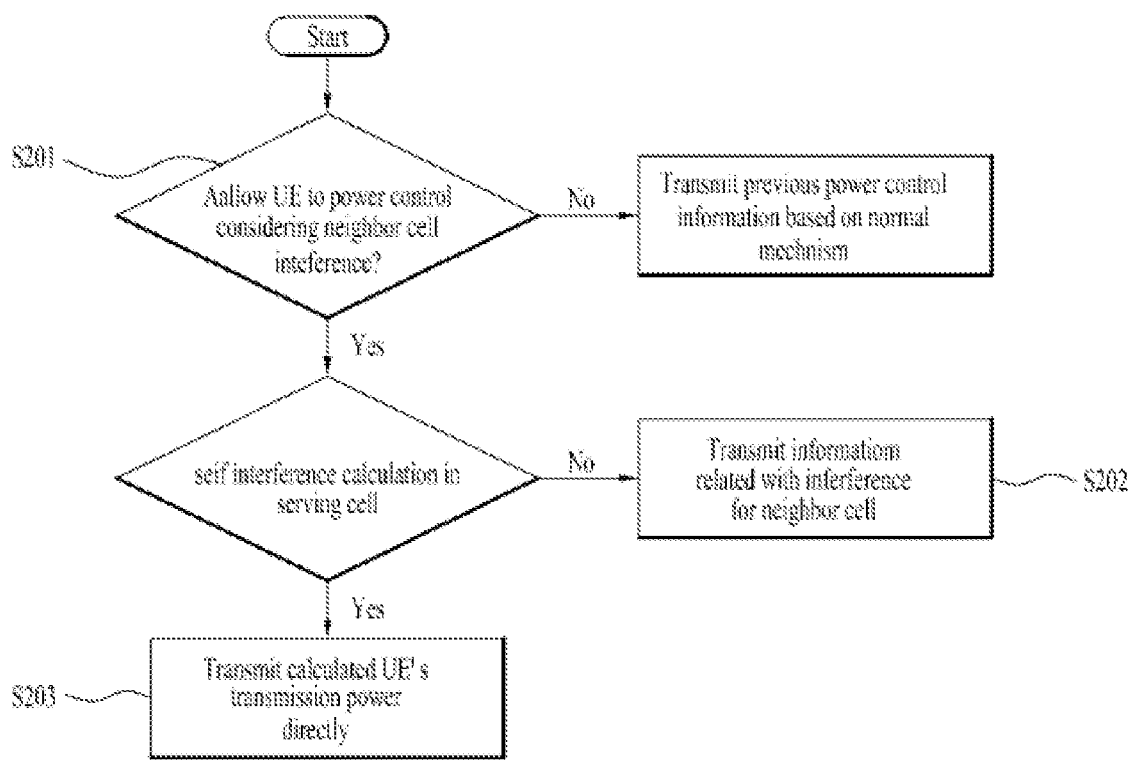

[Fig. 3]
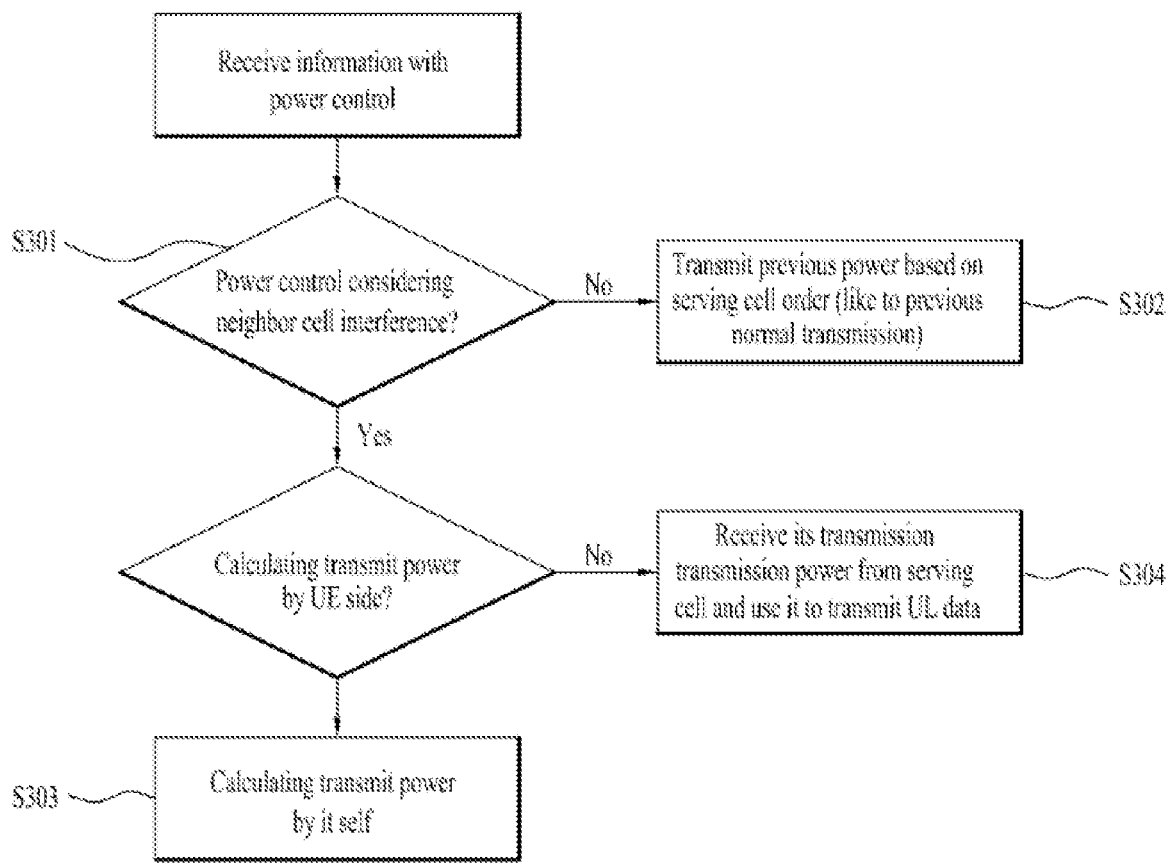

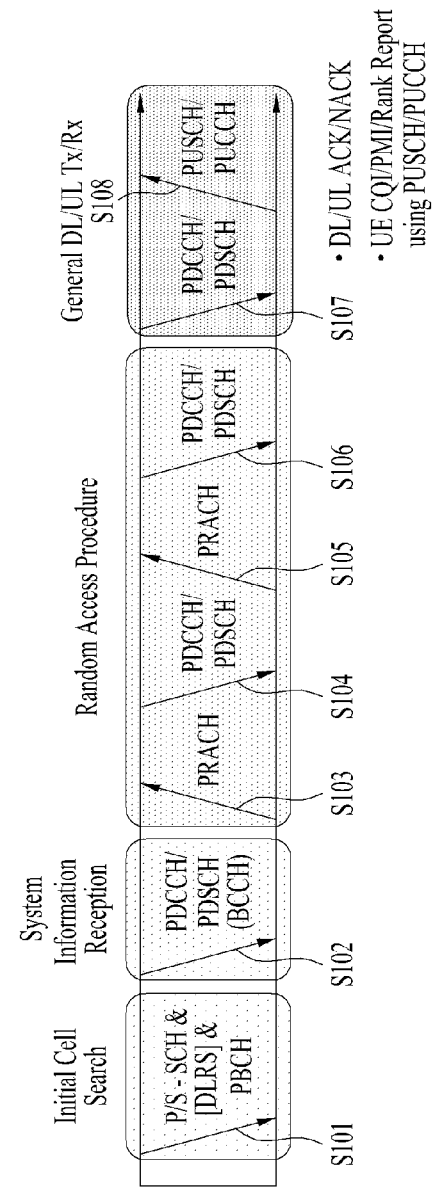
[Fig 4]

[Fig. 5]
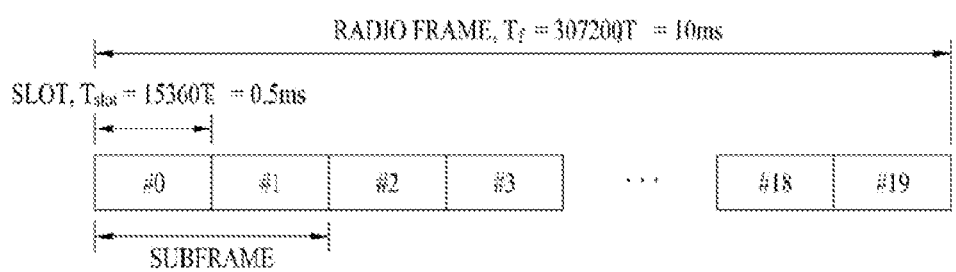

[Fig. 6]
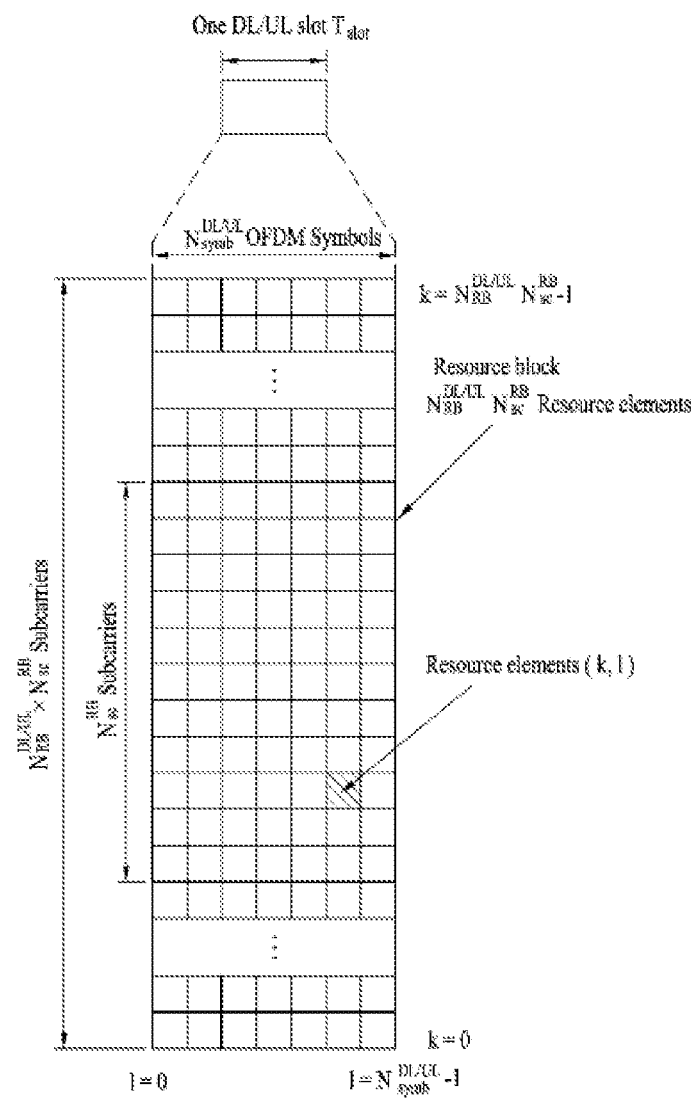

[Fig. 7]
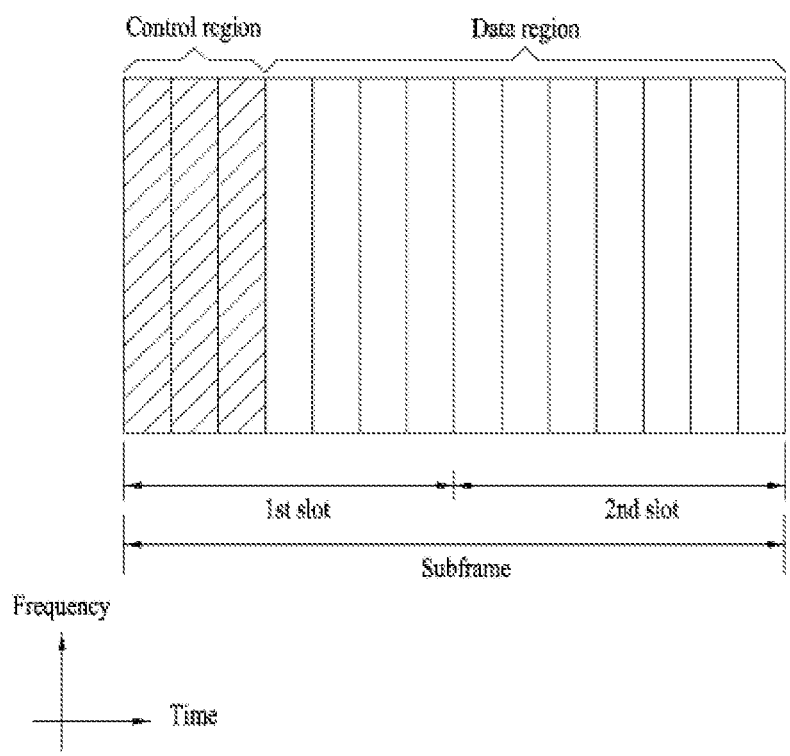

[Fig. 8]
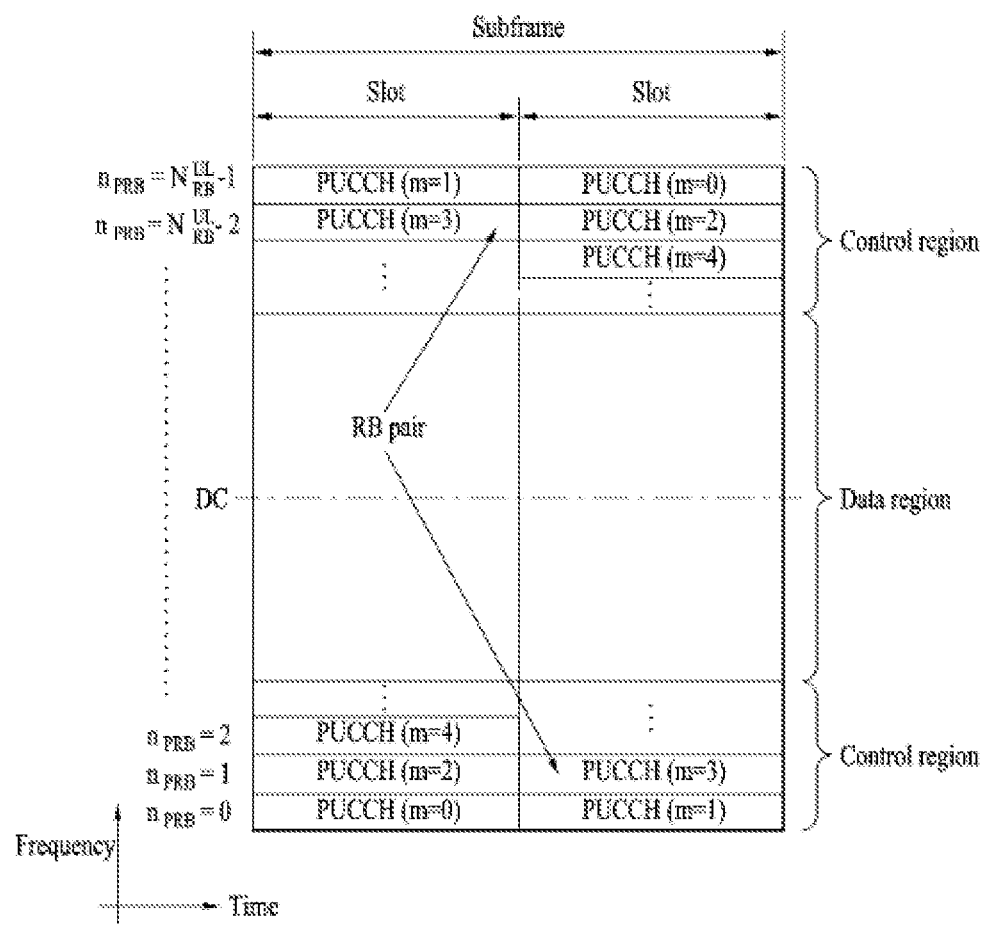

[Fig. 9]
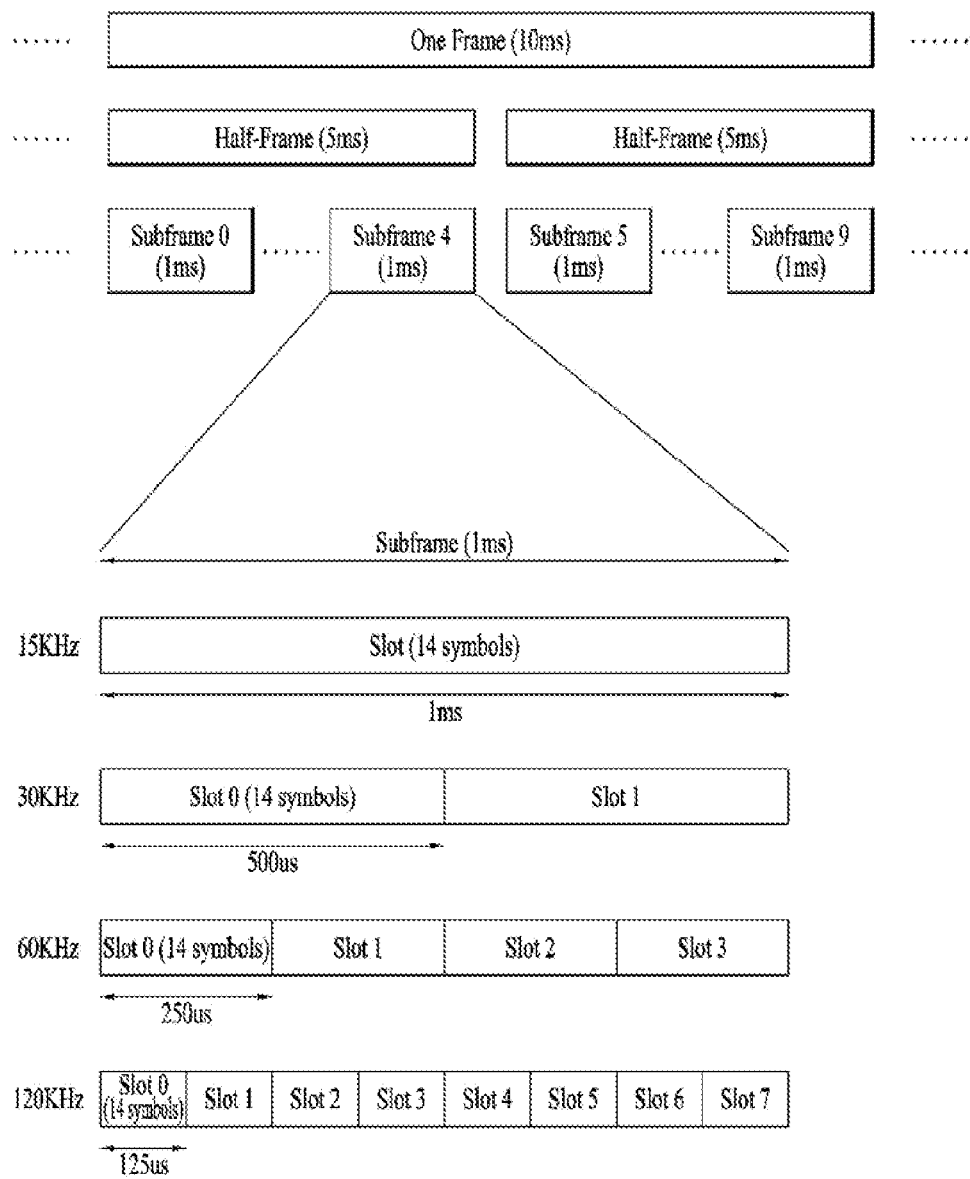

[Fig 10]
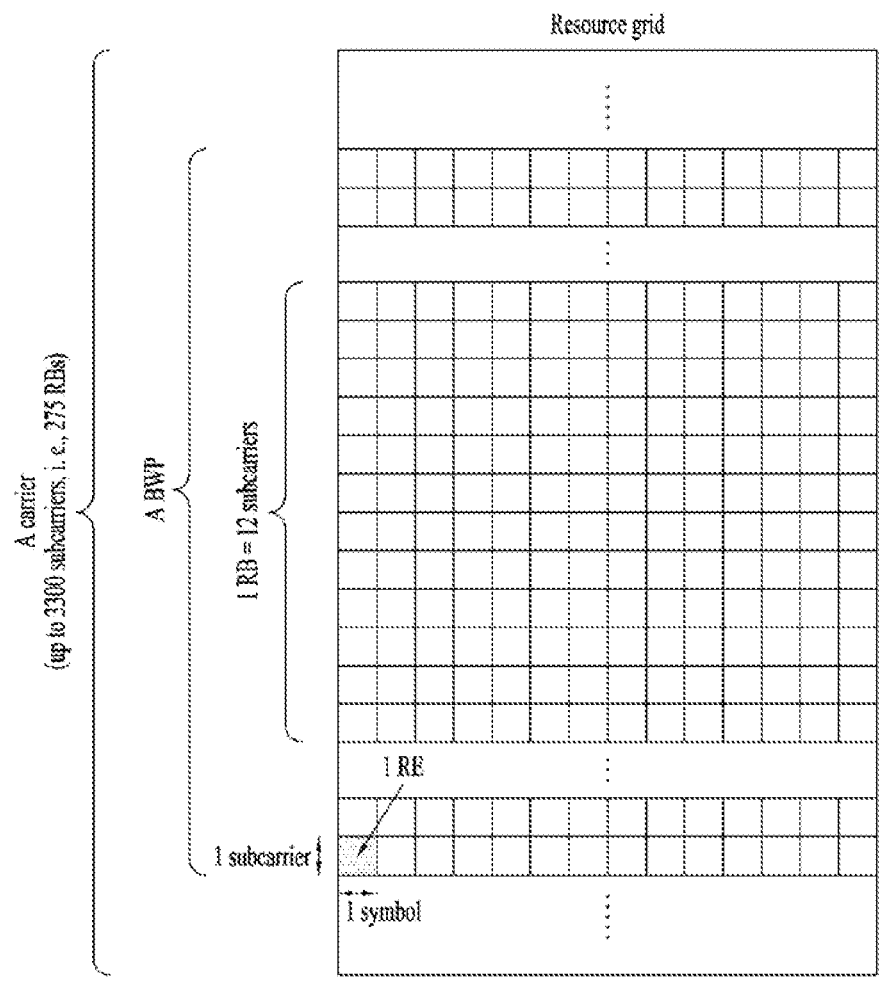

[Fig. 11]
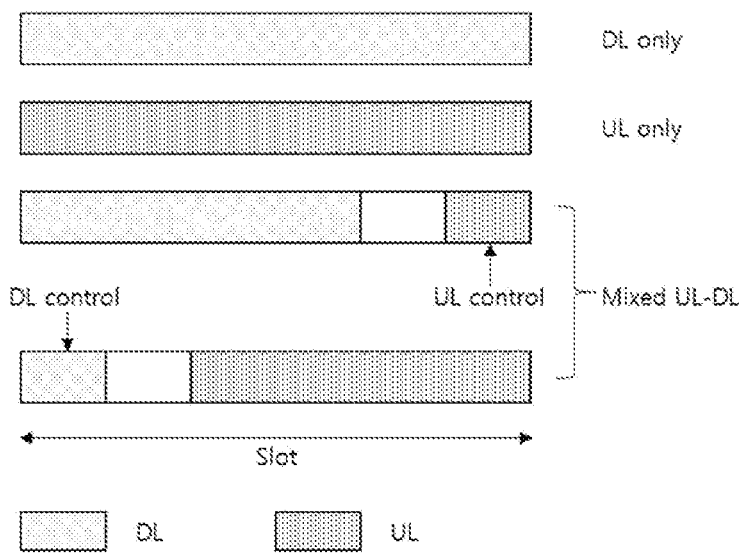
[Fig. 12]
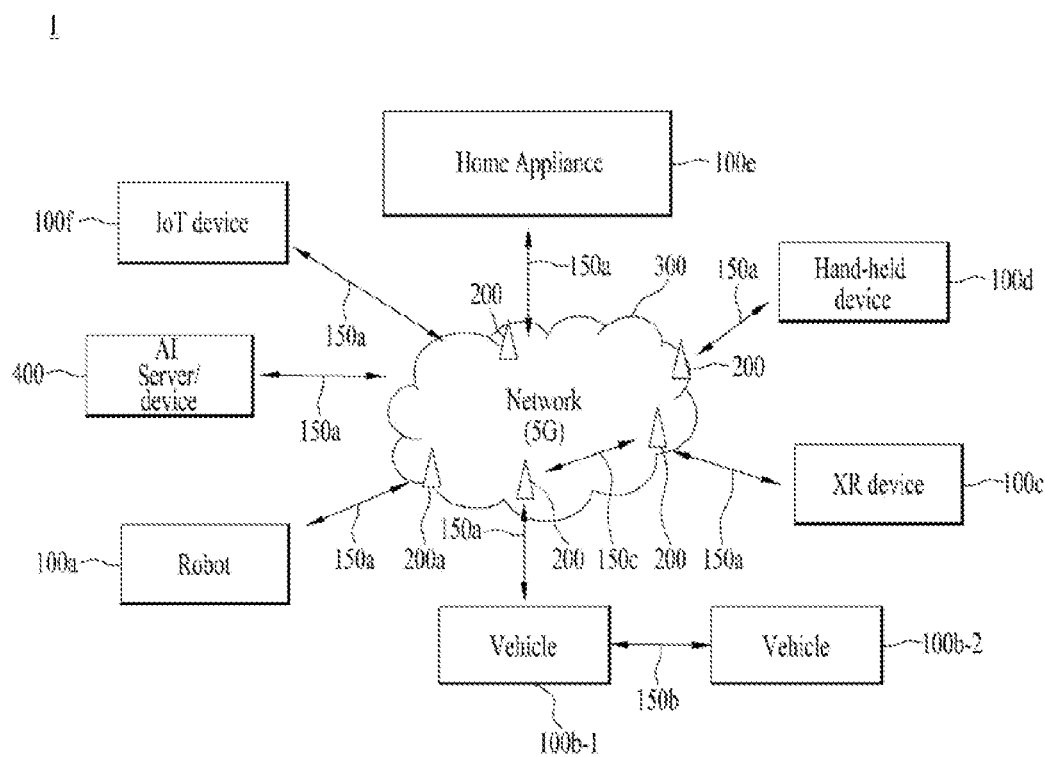

[Fig. 13]
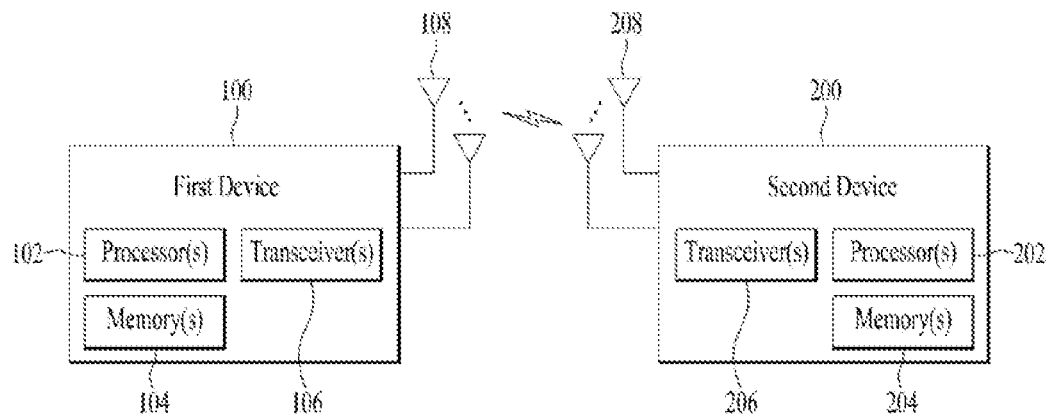
[Fig. 14]
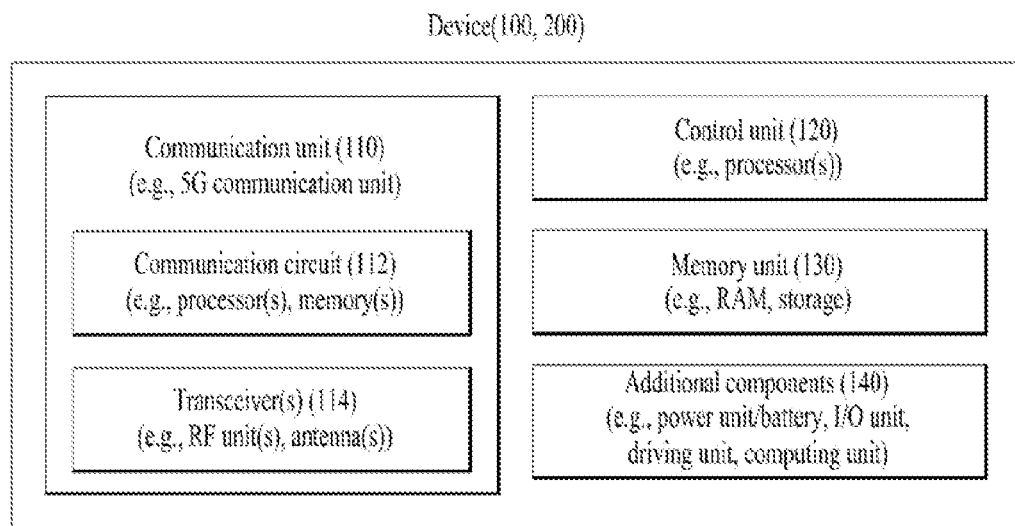

METHOD FOR TRANSMITTING/RECEIVING UPLINK DATA, AND DEVICE THEREFOR

CROSS-REFERENCE TO RELATED APPLICATIONS

This application is the National Stage filing under 35 U.S.C. 371 of International Application No. PCT/KR2019/017670, filed on Dec. 13, 2019, which claims the benefit of earlier filing date and right of priority to Korean Application No. 10-2018-0160503, filed on Dec. 13, 2018, the contents of which are all hereby incorporated by reference herein their entirety.

TECHNICAL FIELD

The present disclosure relates to a method of transmitting and receiving uplink data and device therefor, and more particularly, to a method of transmitting and receiving uplink data in consideration of interference to neighboring cells in aerial communication and device therefor.

BACKGROUND ART

An unmanned aerial vehicle (UAV) or drone means an aerial vehicle capable of flying without human control. Recently, interest has increased in handling aerial vehicles such as drones with increases in leisure time and advances in industry. Drones were conventionally used for military purposes such as practice shooting. However, drones are currently used for various personal and commercial purposes. For example, drones may be used for photography in places where it is difficult for humans to capture including aerial photography or for unmanned courier services for delivering lightweight packages to consumers, search and rescue services, monitoring of critical infrastructures, wildlife protection, and so on.

In general, an aerial vehicle or unmanned aerial vehicle operating in the air is likely to be in a line-of-sight (LOS) state with a base station, unlike a user equipment communicating with the base station on the ground. LOS means that a path between transmitting and receiving antennas is in the line of sight without any obstacle therebetween. In the LOS state, a signal transmitted by the aerial vehicle acts as an interference signal not only to a serving cell but also to neighboring cells, and thus it is expected that system performance will be degraded.

DISCLOSURE

Technical Problem

The object of the present disclosure is to provide a method of efficiently performing radio signal transmission and reception and device therefor.

Specifically, the object of the present disclosure is to provide a method of configuring uplink transmission power of a user equipment (UE) in consideration of interference to neighboring cells and device therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present disclosure, a power control method for a user equipment (UE) is provided. The power control method may include: receiving, from a serving cell, serving cell related transmission power information and neighboring cell related interference information; determining uplink transmission power based on the serving cell related transmission power information and the neighboring cell related interference information, wherein the uplink transmission power may be determined based on a minimum value of (1) maximum transmission power of the UE, (2) transmission power based on the serving cell related transmission power information, and (3) maximum allowable interference power based on the neighboring cell related interference information; and transmitting an uplink signal to the serving cell with the uplink transmission power.

In another aspect of the present disclosure, a UE configured to operate in a wireless communication system is provided. The UE may include: a transceiver; and a processor operatively connected to the transceiver. The processor may be configured to: control the transceiver to receive, from a serving cell, serving cell related transmission power information and neighboring cell related interference information; determine uplink transmission power based on the serving cell related transmission power information and the neighboring cell related interference information, wherein the uplink transmission power may be determined based on a minimum value of (1) maximum transmission power of the UE, (2) transmission power based on the serving cell related transmission power information, and (3) maximum allowable interference power based on the neighboring cell related interference information; and control the transceiver to transmit an uplink signal to the serving cell with the uplink transmission power.

Preferably, the neighboring cell related interference information may include information on a plurality of neighboring cells, and the maximum allowable interference power may be determined based on a minimum value of maximum allowable interference power values for the plurality of neighboring cells.

Preferably, the maximum allowable interference power may be determined based on target received interference power of a neighboring cell and a path loss from the UE to the neighboring cell.

Preferably, the plurality of neighboring cells may be selected in descending order of proximity to the UE, in descending order of reference signal received power (RSRP), or in ascending order of path loss values.

Preferably, the target received interference power of the neighboring cell may be broadcast by the serving cell.

Preferably, the neighboring cell related interference information may include information on a plurality of neighboring cells, and the maximum allowable interference power may be determined based on a minimum value of maximum allowable interference power values for the plurality of neighboring cells that are greater than or equal to a threshold.

Preferably, the neighboring cell related interference information may include information on a plurality of neighboring cells, and the maximum allowable interference power may be determined based on an average value of maximum allowable interference power values for the plurality of neighboring cells.

Advantageous Effects

According to the present disclosure, radio signals may be efficiently transmitted and received in a wireless communication system.

According to the present disclosure, uplink transmission power may be configured in consideration of an interference signal to neighboring cells, thereby preventing degradation of system performance.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the present disclosure, illustrate embodiments of the invention and together with the description serve to explain the principle of the present disclosure.

FIG. 1 is a diagram illustrating aerial communication of an unmanned aerial vehicle (UAV).

FIG. 2 illustrates operations of a base station (BS) according to the present disclosure.

FIG. 3 illustrates operations of a user equipment (UE) according to the present disclosure.

FIG. 4 is a diagram illustrating physical channels and a general signal transmission method using the same in a 3rd generation partnership project (3GPP) system.

FIG. 5 is a diagram illustrating a structure of a radio frame used in a long term evolution (LTE) system.

FIG. 6 illustrates a resource grid of a downlink slot.

FIG. 7 illustrates a structure of a downlink subframe.

FIG. 8 illustrates a structure of an uplink subframe used in the LTE system.

FIG. 9 illustrates a radio frame structure used for NR.

FIG. 10 illustrates a resource grid of a slot.

FIG. 11 illustrates a structure of a self-contained slot.

FIGS. 12 to 14 illustrate a communication system 1 and wireless devices applicable to the present disclosure.

BEST MODE

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). $3^{rd}$ generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

Although the present disclosure is described based on 3GPP LTE/LTE-A for clarity, the technical spirit of the present disclosure is not limited thereto.

FIG. 1 is a diagram illustrating aerial communication of an unmanned aerial vehicle (UAV).

Referring to FIG. 1, the UAV may be a terminal (user equipment (UE)) operating in the air and exchange signals with a serving cell located on the ground. The UE operating in the air may include an aerial vehicle (AV), a UAV, and an aircraft remotely controlled from the ground. In recent years, a drone, a small UAV capable of autonomous flight, has been used for various personal and commercial purposes. In addition, if the drone is applied to a wireless communication system supporting broadband and mobility, the drone may be used in various fields such as logistics and infrastructure management.

However, the AV or UAV operating in the air is likely to be in a line-of-sight (LOS) state with no obstacles between the AV or UAV and a base station (BS), unlike a UE operating on the ground. In such a LOS state, a signal transmitted by the AV may act as an interference signal not only to the serving cell but also to neighboring cells, and thus the system performance may be degraded. Accordingly, the present disclosure proposes a method of configuring uplink transmission power in consideration of interference to neighboring cells based on the characteristics of an AV and apparatus therefor.

1. Uplink Signal Transmission Power Control Method

In wireless communication, large-scale path loss is a very important factor in measuring a received signal. In addition, the state of a wireless connection channel significantly depends on whether the wireless connection is LOS or non-line-of-sight (NLOS). Since an AV is likely to be in the LOS state, a signal transmitted to a serving cell may act as an interference signal to neighboring cells, resulting in a decrease in signal-to-interference-plus-noise ratio (SINR). In addition, the SINR decrease may cause a decrease in overall data throughput. Therefore, the present disclosure proposes a method of configuring transmission power to a serving cell in consideration of interference to one or multiple neighboring cells when a UE such as an AV or UAV or a receiver with radio chips transmits data or a reference signal including a sounding reference signal (SRS).

In the legacy LTE system, UE's data transmission power may be defined as follow.

$$P_{PUSCH} = \min\{P_{max}, 10*10\log_{10}M_{PUSCH} + P_{0,PUSCH} + \alpha_s * PL_s + \delta_{mcs} + f(\Delta)\} \text{ [dBM]} \quad \text{[Equation 1]}$$

In Equation 1, $P_{max}$ denotes the maximum transmission power of the UE, and $M_{PUSCH}$ is a parameter representing the bandwidth of PUSCH resource allocation, which is expressed by the number of effective resource blocks and allocated by the BS.

$P_{O\_PUSCH}$ is a parameter representing the sum of a cell-specific nominal component PO_NOMINAL_PUSCH,c(j) provided from higher layers and a UE-specific component PO_UE_PUSCH,c(j) provided from higher layers, and it is provided by the BS to the UE.

$\alpha_s$ is a path loss compensation factor, which is a cell-specific parameter provided by higher layers and transmitted by the BS with three bits.

$PL_s$ is a downlink (DL) path loss (signal loss) estimate calculated by the UE in a unit of dB, which is provided by the BS to the UE through higher layers.

$f(\Delta)$ is a value representing a current PUSCH power control adjustment state, which may be expressed by a current absolute value or an accumulated value.

Prior to description of the present disclosure, variables are redefined or additional variables are defined for better understanding and explanation of the present disclosure. First, transmission power in consideration of only cell-specific information and path loss related to a serving cell without considering interference to neighboring cells, that is, power of $10*\log_{10} M + P_0 + \alpha_s * PL_s + \delta_{mcs} + f(\Delta)$ to be compared to the maximum transmission power of the UE is redefined as transmission power for the serving cell ($P_{TX\_S}$).

To consider interference power to neighboring cells, an additional variable may be defined. In this specification, the maximum allowable interference power ($P_{TX\_i\_n}$) for an n-th neighboring cell (or neighboring cell n) is defined by $10*\log_{10} M + P_{i_n} + \alpha_{i_n} * PL_{i_n} + (\delta_{mcs}) + f(\Delta)$.

Here, $P_{i_n}$ is target received interference power to the n-th neighboring cell, which is provided by higher layers. $P_{i_n}$ may have the same value or different values for each neighboring cell. The BS may directly broadcast the value of the target received interference power for each cell as follows. Alternatively, the value of the target received interference power may be calculated for each neighboring cell based on schedule information received by the UE.

In addition, $PL_{i_n}$ denotes a DL path loss from a receiver with radio chips such as the UE or AV to the n-th neighboring cell, and $\alpha_{i_n}$ is a path loss compensation factor of the corresponding n-th cell.

In addition, since a fourth MCS-specific element ($\delta_{mcs}$), which the UE autonomously adjusts based on the modulation and coding scheme (MCS) allocated to the UE, is the received power to the neighboring cell rather than the serving cell, the corresponding gain may or may not be present as necessary. In this document, a method of transmitting data or an SRS under a specific constraint in consideration of the maximum allowable or acceptable interference with respect to one or multiple neighboring cells will be described. Further, a method of configuring necessary variables will also be described.

FIG. 2 illustrates operations of a BS according to the present disclosure.

The BS determines whether to configure the transmission power of the UE in consideration of interference to neighboring cells. Here, the determination result is transmitted to the UE in system information or downlink control information (DCI) (S201).

In S201, if a serving cell determines the configuration of the transmission power of the UE in consideration of the interference to neighboring cells, the BS transmits to the UE related information such as the number of neighboring cells, the locations thereof, and target received interference power for each cell. Particular methods therefor will be described later in the following embodiments of the present disclosure (S202).

In contrast to S202 where the BS transmits the corresponding information to allow the UE to perform calculation, the BS may perform the operation performed by the UE based on the information transmitted in S202 and configure related values. The transmission power may be configured according to the following methods as in S202. (S203).

FIG. 3 illustrates operations of a UE according to the present disclosure.

The UE may check whether the BS supports the transmission power configuration according to the present disclosure through system information or whether the serving cell commands the transmission power configuration according to the present disclosure through UE-specific DCI. In this case, if the serving cell supports normal transmission without consideration of interference to neighboring cells, the UE may perform the operation described in S302. On the other hand, if the serving cell supports or desires the transmission power configuration in consideration of interference to neighboring cells, the UE may perform the operation described in S303. If the BS directly provides the transmission power in consideration of interference, the UE may perform the operation described in S304 (S301).

The UE may configure the transmission power in the same way as in the prior art (S302).

The UE may receive the number K of neighboring cells to be considered for interference and information about each cell. The UE may select K specific cells according to the following method, calculate the maximum allowable interference power for each cell according to the method of the present disclosure, and configure uplink (UL) transmission power under conditions that satisfy specific scenarios and restrictions (S303).

The UE may use the UL transmission power configured by the BS as it is. In this case, the BS may perform calculation and transmission according to the method of the present disclosure regarding the BS operation. (S304)

2. Transmission Power Configuration in Consideration of Interference to Single Neighboring Cell In section 2, methods of configuring transmission power in consideration of the amount of interference to a single neighboring cell when a UE transmits data will be described. When the maximum allowable interference power ($P_{TX\_i\_n}$) is calculated in consideration of the amount of interference to a plurality of neighboring cells, resources required for transmission and processing of related necessary information may act as overhead from the perspective of the UE and BS.

Therefore, this section describes a method of configuring the final transmission power by selecting a single neighboring cell n based on locations and reference signal received power (RSRP) of neighboring cells.

Specifically, before calculating $P_{TX\_i\_n}$ for each neighboring cell, the UE assumes that the target received interference power ($P_{i_n}$) and path loss compensation factor ($\alpha_{i_n}$) are the same for each neighboring cell. In addition, the UE selects a single neighboring cell closest to the UE in two or three dimensions or a single neighboring cell with the largest RSRP and then configures the final transmission power in the same way as in proposals 1 and 2 below.

[Proposal 1: Data Transmission within Maximum Allowable Interference Power for Single Neighboring Cell]

In Proposal 1, data is transmitted within the maximum allowable interference power for a single neighboring cell. That is, transmission is performed based on the smallest value among the transmission power for the serving cell ($P_{TX\_S}$), which is configured based on information received from the serving cell, the maximum allowable interference power in the single neighboring cell n ($P_{TX_{i_n}}$), and the maximum transmission power of the UE ($P_{max}$), which may be defined by Equation 2.

$$P_{PUSCH} = \min\{P_{max}, P_{TX_s}, P_{TX_{i_n}}\} \quad \text{[Equation 2]}$$

The single neighboring cell n may be configured according to the following method.

2.1 Method of Selecting Single Neighboring Cell

Alt. 1) Closest Neighbor Cell Based on 2-D Location

Alt. 1 may be applied only when the UE knows 2-D information about neighboring cells. Information on the corresponding neighboring cells may be transmitted from the serving cell in system information or RRC messages or may be transmitted from nearby UAVs/AVs. The UE may select the single nearest neighboring cell based on the 2-D information about the corresponding neighboring cells and calculate the maximum allowable interference power for the corresponding neighboring cell. Thereafter, the UE may compare the maximum allowable interference power ($P_{TX_{in}}$) and the transmission power for the serving cell ($P_{TX\_S}$) within the maximum transmittable power ($P_{max}$) and determine a smaller one as the transmission power.

Alt. 2) Closest Neighbor Cell Based on 3-D Location

Alt. 2 may be applied when the UE knows not only 2-D information about neighboring cells, which is described in Alt. 1, but also height information about the neighboring cells. The UE may select the single nearest neighboring cell based on 3-D information about the corresponding neighboring cells and calculate the maximum allowable interference power for the corresponding neighboring cell. Thereafter, the UE may compare the maximum allowable interference power ($P_{TX_{in}}$) and the transmission power for the serving cell ($P_{TX\_S}$) within the maximum transmittable power ($P_{max}$) and determine a smaller one as the transmission power.

Alt. 3) Highest DL RSRP Value

Considering that the location proximity does not mean the best received signal due to the characteristics of wireless communication, Alt. 1 and Alt. 2 may have limitations in selecting a neighboring cell. According to Alt. 3, a neighboring cell with the largest RSRP may be selected as the single neighboring cell. To select the single neighboring cell, a neighboring cell with the maximum instantaneous value may be selected, or a neighboring cell with the highest average during n measurement periods may be selected.

Alt. 4) Lowest Path Loss Value

Assuming that each BS transmits with the same transmission power, the selection may depend on RSRP as in Alt. 3. However, in a hetero generous cell, the transmission power of each cell may not be the same. According to Alt. 4, a neighboring cell with the lowest path loss value may be selected as the single neighboring cell.

Alt. 5) Combination Between RSRP, Location, and Path Loss

For DL transmission in aerial communication, the RSRP performance of a distant cell may be better than that of a nearby cell due to down-tilted antennas. For UL transmission, an adjacent cell may have higher received power that other cells.

According to Alt. 5, the single neighboring cell may be selected by combining Alt. 1, Alt. 2, Alt. 3 and Alt. 4. In this case, a common high-ranked cell may be selected from among cells commonly listed according to Alts. 1, 2, 3, and 4.

For example, in Alt. 1, neighboring cells 4, 5, 7, and 3 may be listed in order of proximity based on 2-D information. In Alt. 3, neighboring cells 2, 5, 7, and 4 may be listed in descending order of RSRP. In Alt 4, neighboring cell 5, 2, 3, and 9 may be listed. In this case, the UE may select neighboring cell 5.

As another method, a neighboring cell with the largest value may be selected by assigning a point to the list and ranking selected according to each alternatives. In other words, by assigning *A or +A points to neighboring cells listed according to Alt. 1, *B or +B points to neighboring cells listed according to Alt. 2, *C or +C points to neighboring cells listed according to Alt. 3, and *D or +D points to neighboring cells listed according to Alt. 4, one neighboring cell with the most points may be selected.

Alternatively, M options to be combined with the above-described alternatives may be configured and converted into M bits for transmission. For example, when all four alternatives described above are used, four bits may be transmitted, and an indication for combining each alternative may be configured based on the lowest bit. When the UE receives the corresponding information, if each bit is 1, the UE may select final K cells by applying the corresponding alternatives.

Alt. 6) Direct Determination by BS

In Alts. 1 to 5, the UE may autonomously calculate and select the single neighboring cell according to specific rules. However, according to Alt. 6, the BS may select the single neighboring cell based on the location of the UE, information in a CSI report, and/or information about neighboring cells possessed by the serving cell and then inform the UE of the single neighboring cell UE-specifically. Alternatively, the BS may select one reference neighboring cell and then broadcast information about the corresponding cell cell-specifically.

In summary, the UE may select the single neighboring cell according to Alts. 1 to 6, calculate the maximum allowable interference power ($P_{TX\_i\_n}$), and configure the final power for PUSCH transmission. In this case, the value of the target received interference power ($P_{i_n}$) for the n-th neighboring cell required for calculation may be provided from higher layers.

[Proposal 2: Transmission Based on Maximum Value of Transmission Power for Serving Cell and Maximum Allowable Interference Power for Single Neighboring Cell]

In Proposal 1, data may not be transmitted to the serving cell due to power limitations. That is, when the distance from the UE to the serving cell is longer than the distance from the UE to the neighboring cell, the BS may not receive data transmitted by the UE due to power limitations. Proposal 2 is proposed for such a special case. Specifically, transmission is performed based on the maximum value of the maximum allowable interference power ($P_{TX\_i\_n}$) for the single neighboring cell n and the transmission power for the serving cell ($P_{TX\_S}$) within the maximum power allowed for the UE as shown in Equation 3.

$$P_{PUSCH} = \min\{P_{max}, \max[P_{TX_s}, P_{TX_{i_n}}]\} \qquad \text{[Equation 3]}$$

In this case, the single neighboring cell required to calculate $P_{TX\_i\_n}$ may be selected according Alts. 1 to 6 of Proposal 1.

[Proposal 3: Transmission by Reducing Current PUSCH Transmission Power]

In proposal 3, instead of comparing interference to neighboring, cells as in proposals 1 and 2, current PUSCH transmission power is reduced to decrease the effect of interference. Hereinafter, how to reduce the power will be described.

In aerial communication, if the bean; direction is tilted or there is an obstacle, LOS may occur, and in this case, the absolute distance to the serving cell is likely to be longer than absolute distances to neighboring cells, Proposal 3 may be applied to such a case, that is, when the distance to the serving cell is greater than distances to neighboring cells.

If the path loss for the neighboring cell n ($\alpha_{i_n}*PL_{i_n}$) is excluded from the existing PUSCH transmission equation: $P_{TX\_S}(10*\log_{10} M+P_0+\alpha_s*PL_s+\delta_{mcs}+f(\Delta))$, the following terms: $10*\log_{10} M+P_0+\alpha_s*PL_s-\alpha_{i_n}*PL_{i_n}$ may be obtained by excluding transmission format (MCS) gain and closed loop power control gain.

From the perspective of the BS, if the distance from the UE to the neighboring cell n is similar to the distance from the UE to the serving cell, and the fractional path loss compensation factor of the neighboring cell n is the same as that of the serving cell, non-path loss compensation power control may be achieved. Therefore, the UE may perform transmission in inverse proportion to the difference to the serving cell as follows.

$$P_{TX_s} = 10 * \log_{10} M + P_0 + \alpha_s * PL_s - \left(1 - \frac{d_n}{d_s}\right)\alpha_n \text{ or}$$
$$\left(1 - \frac{d_n}{d_s}\right)\alpha_s * PL_n + \delta_{mxs} + f(\Delta)$$

[Equation 4]

In Equation 4, $d_n$ denotes a 2-D or 3-D distance from the AV/UAV to the neighboring cell n, and ds denotes a 2-D or 3-D distance from the AV/UAV to the serving cell. The selection of the single neighboring cell may be performed according to Alts. 1 to 4 of Proposal 1.

If the UE knows the value of the fractional path loss compensation factor for the neighboring cell n, the UE may perform calculation and transmission based on the value. On the contrary, if the UE does not know the value, the UE may transmit the PUSCH based on the same value as that for the serving cell. That is, if the UE is close to the neighboring cell n and far away from the serving cell, the UE performs transmission by excluding the path loss corresponding to the distance. If the distance to the neighboring cell n is equal to the distance to the serving cell, the UE may perform transmission without consideration of interference.

3. Transmission Power Configuration in Consideration of Interference for Multiple Neighboring Cells According to the power configuration method in consideration of a single neighboring cell, before calculating $P_{TX\_i\_n}$ for each neighboring cell, the UE may assume that the target received interference power ($P_{i_n}$) and path loss compensation factor ($\alpha_{i_n}$) are the same for each neighboring cell and then perform data transmission by selecting the neighboring cell n based on the RSRP or 2/3-D distance. However, if the target received interference power or path loss compensation factor varies for each neighboring cell, the maximum allowable interference power may also vary for each neighboring cell. Accordingly, how the UE selects a plurality of cells and configures transmission power in consideration of the maximum allowable interference power for the plurality of cells will be described in section 3.

A method of selecting a plurality of neighboring cells and a method of configuring the target received interference power for each of the plurality of selected neighboring cells will be described later. Proposals 4, 5, and 6 describe methods of configuring the final transmission power in consideration of the maximum allowable interference power values for the plurality of selected neighboring cells.

3.1 Method of Selecting Multiple Neighboring Cells

This section relates to Alts. 1 to 4 described in section 2.1 (Method of Selecting Single Neighboring Cell). The number K of selected cells among a plurality of neighboring cells may be broadcast by the BS or may be notified UE-specifically.

Alt. 1) Closest Neighbor Cell Based on 2-D Location

Alt. 1 may be applied only when the UE knows 2-D information about neighboring cells. Information on the corresponding neighboring cells may be transmitted in system information or RRC messages together with cell information during cell re/selection. Alternatively, the UE may obtain the corresponding information from nearby UAVs/AVs. The UE may select K nearest cells based on the corresponding information.

Alt. 2) Closest Neighbor Cell Based on 3-D Location

Alt. 2 may be applied when the UE knows not only 2-D information about neighboring cells but also height information about the neighboring cells. In Alt. 2, K neighboring cell may be selected with respect to the smallest value based on 3-D information received in the same manner as Alt. 1.

Alt. 3) Highest DL RSRP Value

In Alt. 3, neighboring cells may be selected based on RSRP information. Regarding the selection, K neighboring cells may be selected in descending order of RSRO with respect to a neighboring cell with the maximum instantaneous value. Alternatively, K neighboring cells with high average values during n measurement periods may be selected.

Alt. 4) Lowest Path Loss Value

As an extension of Alt. 4 of Proposal 1 where a single neighboring cell with the lowest path loss value is selected, it is proposed to list the path loss values of neighboring cells having small measurements with respect to the lowest path loss value and then select K neighboring cells based on the smallest value. Specifically, the K neighboring cells may be selected based on one-to-one mapping.

Alt. 5) Combination Between RSRP and Location

For DL transmission in aerial communication, the RSRP performance of a distant cell may be degraded due to down-tilted antennas. For UL transmission, an adjacent cell may have higher received power than other cells. According to Alt. 5, multiple neighboring cells may be selected by combining Alt. 1, Alt. 2, Alt. 3 and Alt. 4. In this case, K common high-ranked cells may be selected from among cells commonly listed according to Alts. 1, 2, 3, and 4. For example, in Alt. 1, neighboring cells 4, 5, 7, 3, 2, and 6 may be listed in order of proximity based on 2-D information. In Alt. 2, neighboring cells 7, 3, 2, 4, 5, and 9 may be listed. In Alt 3, neighboring cell 7, 2, 3, 4, 5, and 9 may be listed based on RSRP. In Alt 4, neighboring cell 1, 3, 2, 6, 4, and 8 may be listed. If K=3, the UE may finally select neighboring cells 2, 3, and 4, which are commonly high-ranked. When it is difficult to select common K cells, the UE may select cells less than K and use the cells as information required to configure the final PUSCH transmission power. As another method, K neighboring cells may be selected with respect to the largest points by assigning a point to the list and ranking selected according to each alternatives. In other words, by assigning *A or +A points to neighboring cells listed according to Alt. 1, *B or +B points to neighboring cells listed according to Alt. 2, *C or +C points to neighboring cells listed according to Alt. 3, and *D or +D points to neighboring cells listed according to Alt. 4, K neighboring cells may be selected in descending order of points. Alternatively, M options to be combined with the above-described alternatives may be configured and converted into M bits for transmission. For example, when all four alternatives described above are used, four bits may be transmitted, and an indication for combining each alternative may be configured based on the lowest bit. When the UE receives the corresponding information, if each bit is 1, the UE may select final K cells by applying the corresponding alternatives.

Alt. 6) Direct Determination by BS

Similarly to Alt. 6 of Proposal 1, the BS may directly designate K neighboring cells to the UE. In Alt. 6, the BS may transmit the K neighboring cells UE-specifically. Alternatively, the BS may select one reference neighboring cell and then broadcast information about the corresponding cell cell-specifically.

3.2 Cell-Specific Target Received Interference Power Configuration for Neighboring Cells In section 3.2, methods of configuring variables required for the UE to calculate the above-described maximum allowable interference power ($P_{TX\_i\_n}$), that is, the target received interference power ($P_{i_n}$) will be described.

Alt. 1: Determination and Broadcasting of Single Value by BS

In Alt. 1, the BS may configure and broadcast the same target received interference power. In this case, the maximum allowable interference power may vary depending on distances between the UE and neighboring cells.

Alt. 2: Broadcasting of Value for Each Neighboring Cell by BS

In Alt. 2, the BS may configure and broadcast the target received interference power for each neighboring cell. The same or similar maximum allowable interference power may be configured for all cells, regardless of distances between the UE and neighboring cells.

Alt. 3: Broadcasting of Specific Values by BS and Calculation by UE

In Alt 2, the target received interference power is transmitted for all neighboring cells, which may cause overhead. To solve such a problem, the BS may transmit two values: maximum and minimum values to the transmitting UE in system information. The UE may allocate the maximum value to the first cell among the K selected neighboring cells and allocate the minimum value to the last cell, i.e., K-th cell. Then, the UE may allocate the target received interference power to the remaining K-2 cells in inverse proportion to the distance or RSRP difference.

[Proposal 4: Transmission Based on Minimum Value of Maximum Allowable Interference Power Values for Multiple Neighboring Cells]

The same or different target received interference power may be configured for each neighboring cell. When the target received interference power for each neighboring cell is not the same, if only a single neighboring cell is selected based on locations or RSRP, system performance may be limited and degraded.

The UE may transmit data as shown in Equation 5 within a range that does not exceed a specific amount of interference to a list of the K selected neighboring cells.

$$P_{PUSCH} = \min\{P_{max}, P_{TX_s}, \min(P_{TX_{i_1}}, \ldots, P_{TX_{i_k}})\} \quad \text{[Equation 5]}$$

In proposal 4, since power is transmitted under a condition in which interference does not exceed a predetermined threshold, actual data transmission power for the serving cell may become extremely low due to the minimum value constraint. That is, when the smallest interference threshold is observed, there may be a disadvantage in that received power may be very low from the viewpoint of the serving cell. Such shortcomings may be compensated for by Proposals 5 and 6.

[Proposal 5: Transmission Based on Average Value of Maximum Allowable Interference Power Values for Multiple Neighboring Cells]

In Proposal 5, transmission is performed by comparing average values of all K selected cells, instead of using as a reference the minimum allowable interference power mentioned in proposal 4. According to Proposal 5, the shortcomings of Proposal 4 may be overcome, and the mathematical notation of Proposal 5 may be defined by Equation 6.

$$P_{PUSCH} = \min\{P_{max}, P_{TX_s}, avg(P_{TX_{i_1}}, \ldots, P_{TX_{i_k}})\} \quad \text{[Equation 6]}$$

[Proposal 6: Transmission Based on Minimum Value Exceeding Predetermined Threshold among Maximum Allowable Interference Power Values for Multiple Neighboring Cells]

In Proposal 6, before configuring the smallest value according to Proposal 4, the BS may first broadcast a reference threshold ($P_{TX_{ref}}$) to configure the corresponding value. The UE may select and configure the smallest value under a condition that satisfies the reference threshold, $$P_{PUSCH} = \min\{P_{max}, P_{TX_s}, \min(P_{TX_{i_n}} | P_{TX_{i_n}} \geq P_{rx_{ref}} \text{ and} \quad \text{[Equation 7]}$$
$$P_{TX_{i_n}} \in (P_{TX_{i_1}}, \ldots, P_{TX_{i_k}}))\}$$

That is, the UE may select the smallest value from values more than or equal to $P_{TX_{ref}}$ among the maximum allowable interference power values for the K selected cells.

In summary, the UE may autonomously perform the above-described calculation and transmission for each of Proposals 1 to 6, and the BS may calculate and indicate corresponding values in advance. To distinguish with normal PUSCH transmission power, whether embodiments of the present disclosure are applied may be informed UE-specifically by DCI, or whether embodiments of the present disclosure are supported may be informed cell-commonly by system information. For example, two bits may be allocated as follows: one bit may be used for terrestrial UEs, and the other one bit may be used for aerial UEs. Alternatively, only one bit may be allocated for aerial UEs to select and configure ON/OFF of the corresponding method.

Hereinafter, LTE and NR systems, each of which is a wireless communication system applicable to embodiments of the present disclosure, will be described.

4. LTE System

In a wireless communication system, a UE may receive information from a BS on DL and transmit information to the BS on UL. Information exchanged between the BS and UE may include data and various types of control information, and various physical channels may be used depending on the types/usages of exchanged information.

FIG. 4 illustrates physical channels and a general method for transmitting signals on the physical channels in the 3GPP system.

Referring to FIG. 4, when a UE is powered on or enters a new cell, the UE performs initial cell search (S101). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a DownLink reference signal (DL RS).

After the initial cell search, the UE may acquire detailed system information by receiving a physical downlink control channel (PDCCH) and receiving a physical downlink shared channel (PDSCH) based on information included in the PDCCH (S102).

If the UE initially accesses the eNB or has no radio resources for signal transmission to the eNB, the UE may perform a random access procedure with the eNB (S103 to S106). In the random access procedure, the UE may transmit a predetermined sequence as a preamble on a physical random access channel (PRACH) (S103 and S105) and may receive a response message to the preamble on a PDCCH and a PDSCH associated with the PDCCH (S104 and S106). In the case of a contention-based RACH, the UE may additionally perform a contention resolution procedure.

After the above procedure, the UE may receive a PDCCH and/or a PDSCH from the eNB (S107) and transmit a physical uplink shared channel (PUSCH) and/or a physical uplink control channel (PUCCH) to the eNB (S108), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

FIG. 5 illustrates an exemplary radio frame structure used in a wireless communication system.

Referring to FIG. 5, a radio frame used in 3GPP LTE/LTE-A has a length of 10 ms (307200 Ts) and includes 10 subframes in equal size. The 10 subframes in the radio frame may be numbered. Each subframe has a length of 1 ms and includes two slots. Each slot has a length of 0.5 ms. Here, Ts denotes sampling time and is represented as Ts=1/(2048*15 kHz)=3.2552×10-8(≈33 ns). The slot includes a plurality of OFDM symbols in the time domain and includes a plurality of resource blocks (RBs) in the frequency domain. In the LTE system, one RB includes 12 subcarriers by 7 (or 6) OFDM symbols. A transmission time interval (TTI), which is a time unit for data transmission, may be defined as at least one subframe. The above-described structure of the radio frame is just exemplary. And, the number of subframes included in a radio frame, the number of slots included in a subframe and/or the number of OFDM symbols included in a slot can be modified in various ways. The above-described radio frame structure is merely exemplary, and thus the number of subframes in a radio frame, the number of slots in a subframe, or the number of OFDM symbols in a slot may vary.

FIG. 6 illustrates a resource grid of a DL slot.

Referring to FIG. 5, a DL slot may include $N_{symb}^{DL}$ OFDM symbols in the time domain and include $N_{RB}^{DL}$ RBs in the frequency domain. Since each RB may include $N_{sc}^{RB}$ subcarriers, the DL slot may include $N_{RB}^{DL} \times N_{sc}^{RB}$ subcarriers in the frequency domain. Although FIG. 3 shows an example in which the DL slot includes 7 OFDM symbols and the RB includes 12 subcarriers, the present disclosure is not limited thereto. For instance, the number of OFDM symbols included in the DL slot may vary depending to the length of a cyclic prefix (CP).

Each element on the resource grid may be referred to as a resource element (RE). One RE may be indicated by one OFDM symbol index and one subcarrier index. One RB may include $N_{symb}^{DL} \times N_{sc}^{RB}$ REs. The number ($N_{RB}^{DL}$) of RBs included in the DL slot may depend on a DL transmission bandwidth configured for a cell.

FIG. 7 illustrates a downlink (DL) subframe structure used in 3GPP LTE/LTE-A.

Referring to FIG. 7, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI may include UL/DL scheduling information, UL transmission (Tx) power control commands, and so on.

The PDCCH may carry information about the transmission format and resource allocation for a downlink shared channel (DL-SCH), information about the transmission format and resource allocation for an uplink shared channel (UL-SCH), paging information on a paging channel (PCH), system information on a DL-SCH, resource allocation information on a higher layer control message such as a random access response transmitted on a PDSCH, a Tx power control command set for UEs in a UE group, a Tx power control command, indication information for activation of a voice over IP (VoIP), and so on. A plurality of PDCCHs may be transmitted in a control region, and a UE may monitor the plurality of PDCCHs. The PDCCH may be transmitted on aggregation of one or more consecutive control channel elements (CCEs). The CCE may refer a logical allocation unit used to provide a PDCCH coding rate depending on the state of a radio channel. The CCE corresponds to a plurality of resource element groups (REGs). The format of the PDCCH and the number of PDCCH bits may be determined according to the number of CCEs. The BS may determine the PDCCH format based on DCI to be transmitted to the UE and attach a cyclic redundancy check (CRC) to control information. The CRC may be masked with an identifier (ID) (e.g., radio network temporary identifier (RNTI)) depending on the owner or purpose of the PDCCH. For example, if the PDCCH is for a specific UE, the CRC may be masked with the ID of the corresponding UE (e.g., cell-RNTI (C-RNTI)). If the PDCCH is for a paging message, the CRC may be masked with a paging identifier (e.g., paging-RNTI (P-RNTI)). If the PDCCH is for system information (more particularly, for a system information block (SIB)), the CRC may be masked with a system information- RNTI (SI-RNTI). Further, if the PDCCH is for a random access response, the CRC may be masked with a random access-RNTI (RA-RNTI).

FIG. 8 illustrates the structure of a UL subframe used in the LTE system.

Referring to FIG. 8, a UL subframe may include a plurality of slots (e.g., two slots). Each slot may include a different number of SC-FDMA symbols depending on the length of a CP. The UL subframe may be divided into a data region and a control region in the frequency domain. The data region may include a PUSCH and be used to transmit a data signal such as voice. The control region may include a PUCCH and be used to transmit uplink control information (UCI). The PUCCH may include an RB pair located at the ends of the data region in the frequency domain and be hopped on slot boundaries.

Power Control for PUSCH Transmission

To control UL transmission power of a UE, various parameters may be used. These parameters may be classified into open-loop power control (OLPC) parameters and closed-loop power control (CLPC) parameters. The OLPC parameter may be a factor for controlling power by estimating and compensating for the attenuation of a DL signal from a serving cell (or serving BS) to which the UE belongs. For example, when the attenuation of the DL signal increases as the distance from the UE to the serving cell increases, UL power control may be performed so that the UL transmission power increases. The CLPC parameter may be used to control UL power by directly transmitting information (e.g., TPC command) required for the BS to control the UL transmission power. The UL transmission power may be controlled in consideration of both of OLPC and CLPC.

Hereinafter, how PUSCH transmission power is determined for PUSCH transmission at the UE will be described. Equation 8 is used to determine the transmission power of the UE when only the PUSCH is transmitted without simultaneous transmission of the PUCCH in subslot/slot/subframe index i of serving cell c.

$$P_{PUSCH,c}(i) = \min\left\{ \begin{array}{c} P_{CMAX,c}(i) \\ 10\log_{10}(M_{PUSCH,c}(i)) + P_{OPUSCH,c}(i) + \alpha_c(i) \cdot PL_C + \Delta_{TF,c}(i) + f_c(i) \end{array} \right\} [dBm]$$

Equation 9 is used to determine the PUSCH transmission power when the PUCCH and the PUSCH are simultaneously transmitted in subframe index i of serving cell c.

$$P_{PUSCH,c}(i) = \min\left\{ \begin{array}{c} 10\log_{10}(\hat{P}_{CMAX,c}(i) - \hat{P}_{PUCCH}(i)) \\ 10\log_{10}(M_{PUSCH,c}(i)) + P_{OPUSCH,c}(i) + \alpha_c(i) \cdot PL_C + \Delta_{TF,c}(i) + f_c(i) \end{array} \right\} [dBm]$$

Equation 10 is used to determine the PUSCH transmission power assumed for accumulation of TPC commands received with DC format 3/3A when no PUSCH is transmitted in subframe index i of serving cell c.

$$P_{PUSCH,c}(i) = \min(P_{CMAX,c}(i), P_{OPUSCH,c}(1) + \alpha_c(1) \cdot PL_C + f_c(i))[dBm]$$

The following parameters, which will be described with reference to Equations 8, 9 and 10, are to determine the UL transmission power of the UE in serving cell c. Here, $P_{CMAX,c}(i)$ denotes the maximum transmission power of the UE in subslot/slot/subframe index i, and $\hat{P}_{CMAX,c}(i)$ denotes the linear value of $P_{CMAX,c}(i)$. In addition, $\hat{P}_{PUCCH}(i)$ denotes the linear value of $P_{PUCCH}(i)$ (where $P_{PUCCH}(i)$ is PUCCH transmission power in subslot/slot/subframe index i).

In Equation 8, $M_{PUSCH,c}(i)$ a is a parameter indicating the bandwidth for PUSCH resource allocation, which is represented by the number of effective RBs for subframe index i, and MP_USCH,c(i) may be assigned by the BS. PO_PUSCH,c(j) is a parameter indicating the sum of a cell-specific nominal component PO_NOMINAL_PUSCH,c(j), which is provided by higher layers, and a UE-specific component PO_UE_PUSCH,c(j), which is provided by higher layers, and PO_PUSCH,c(j) may be provided by the BS to the UE. For PUSCH transmission/retransmission corresponding to a dynamic scheduled grant, j=1. For PUSCH transmission/retransmission corresponding to a random access response grant, j=2. PO_UE_PUSCH,c(2)=0 and PO_NOMINAL_PUSCH,c(2)=PO_PRE+ΔPREAMBLE_Msg3. Parameters preambleInitialReceivedTargetPower (PO_PRE) and ΔPREAMBLE_Msg3 may be signaled by higher layers.

A path loss compensation factor, $\alpha_c(j)$ is a cell-specific parameter provided by higher layers and transmitted with 3 bits from the BS. For j=0 or 1, α∈ {0, 0.4, 0.5, 0.6, 0.7, 0.8, 0.9, 1}. For j=2, $\alpha_c(j)$=1.

$PL_c$ is a DL path loss (or signal loss) estimate, which is calculated by the UE in a unit of dB and represented as follows: $PL_C$=referenceSignalPower-higher layer filtered RSRP. Here, referenceSignalPower may be signaled to the UE by the BS via higher layers.

In addition, $f_c(i)$ is a value indicating the current PUSCH power control adjustment state for subslot/slot/subframe index i, and $f_c(i)$ may be expressed as a current absolute value or an accumulated value. When accumulation is enabled by a parameter provided by higher layers or when a TPC command δPUSCH,c is included in the PDCCH together with DCI format 0 for serving cell c where the CRC is scrambled with a temporary C-RNTI, the equation of $f_c(i)=f_c(i-1)+\delta_{PUSCH,c}(i-K_{PUSCH})$ may be satisfied. In this case, $\delta_{PUSCH,c}(i-K_{PUSCH})$ may be signaled by the PDCCH with DCI format 0/4 or 3/3A in subframe i–$K_{PUSCH}$, where $f_c(0)$ is the first value after reset of the accumulated value.

5. NR System

FIG. 9 illustrates a radio frame structure used for NR.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols.

Table 1 exemplarily illustrates that the number of symbols per slot, the number of slots per frame, and the number of slots per subframe vary according to SCSs in a normal CP case.

TABLE 1

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: number of symbols in a slot
* $N^{frame, u}_{slot}$: number of slots in a frame
* $N^{subframe, u}_{slot}$: number of slots in a subframe Table 2 illustrates that the number of symbols per slot, the number of slots per frame, and the number of slots per subframe vary according to SCSs in an extended CP case.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

The frame structure is merely exemplary, and the number of subframes, the number of slots, and the number of symbols in a frame may vary. In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells. A symbol may include an OFDM symbol (or a CP-OFDM symbol) and an SC-FDMA symbol (or a discrete Fourier transform-spread-OFDM (DFT-s-OFDM) symbol).

NR supports various numerologies (or subcarrier spacings (SCSs)) to provide various 5G services. For example, the NR system may support a wide area in conventional cellular bands in an SCS of 15 kHz and support a dense urban and low latency environment and a wider carrier bandwidth in an SCS of 30/60 kHz. In an SCS of 60 kHz or above, the NR system supports a bandwidth higher than 24.25 GHz to overcome phase noise.

NR frequency bands may be classified into two frequency ranges. These two frequency ranges may be defined as FR1 and FR2. FR1 and FR2 are configured as table 3. And FR2 may mean a millimeter wave (mmW).

TABLE 3

| Frequency Range Designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

FIG. 10 illustrates a resource grid during the duration of one slot. A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped. FIG. 11 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
   DL region+Guard period (GP)+UL control region
   DL control region+GP+UL region
      DL region: (i) DL data region, (ii) DL control region+ DL data region
      UL region: (i) UL data region, (ii) UL data region+UL control region The PUSCH may carry UL data (e.g., UL-SCH transport block (UL-SCH TB)) and/or UCI, and it may be transmitted based on a cyclic prefix-orthogonal frequency division multiplexing (CP-OFDM) waveform or a discrete Fourier transform-spread-orthogonal frequency division multiplexing (DFT-s-OFDM) waveform. When the PUSCH is transmitted based on the DFT-s-OFDM waveform, the UE may apply transform precoding to transmit the PUSCH. For example, when the transform precoding is not allowed (e.g., the transform precoding is disabled), the UE may transmit the PUSCH based on the CP-OFDM waveform. When the transform precoding is allowed (e.g., the transform precoding is enabled), the UE may transmit the PUSCH based on the CD-OFDM waveform or the DFT-s-OFDM waveform. PUSCH transmission may be dynamically scheduled by a UL grant in DCI or semi-statically scheduled based on higher layer (e.g., RRC) signaling (and/or Layer 1 (L1) signaling (e.g., PDCCH)) (configured grant). Both codebook based PUSCH transmission and non-codebook based PUSCH transmission may be allowed.

FIG. 12 illustrates a communication system 1 applied to the present disclosure.

Referring to FIG. 12, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

FIG. 13 illustrates wireless devices applicable to the present disclosure.

Referring to FIG. 13, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 12.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

FIG. 14 illustrates another example of a wireless device applied to the present disclosure. The wireless device may be implemented in various forms according to a use case/service (refer to FIG. 12).

Referring to FIG. 14, wireless devices 100 and 200 may correspond to the wireless devices 100 and 200 of FIG. 12 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 14. For example, the transceiver(s) 114 may include the one or more transceivers 106 and 206 and/or the one or more antennas 108 and 208 of FIG. 14. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 12), the vehicles (100b-1 and 100b-2 of FIG. 12), the XR device (100c of FIG. 12), the hand-held device (100d of FIG. 12), the home appliance (100e of FIG. 12), the IoT device (100f of FIG. 12), a digital broadcasting terminal, a hologram device, a public safety device, an MTC device, a medical device, a FinTech device (or a finance device), a security device, a climate/environment device, the AI server/device (400 of FIG. 12), the BSs (200 of FIG. 12), a network node, or the like. The wireless device may be mobile or fixed according to a use case/service.

In FIG. 14, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to user equipments, base stations, or other devices in a wireless mobile communication system.

The invention claimed is:

1. A power control method for a user equipment (UE), the method comprising:
receiving, from a serving cell, information on transmission power related to the serving cell and information on interference related to a neighboring cell;
determining uplink transmission power based on the information on the transmission power related to the serving cell and the information on the interference related to the neighboring cell, wherein the uplink transmission power is determined based on a minimum value of (1) maximum transmission power of the UE, (2) transmission power based on the information on the transmission power related to the serving cell, and (3) maximum allowable interference power based on the information on the interference related to the neighboring cell; and
transmitting an uplink signal to the serving cell based on the uplink transmission power.

2. The method of claim 1, wherein the information on the interference related to the neighboring cell includes information on a plurality of neighboring cells, and wherein the maximum allowable interference power is determined based on a minimum value of maximum allowable interference power values for the plurality of neighboring cells.

3. The method of claim 1, wherein the maximum allowable interference power is determined based on target received interference power of the neighboring cell and a path loss from the UE to the neighboring cell.

4. The method of claim 2, wherein the plurality of neighboring cells are selected in descending order of proximity to the UE, in descending order of reference signal received power (RSRP), or in ascending order of path loss values.

5. The method of claim 3, wherein the target received interference power of the neighboring cell is broadcast by the serving cell.

6. The method of claim 1, wherein the information on the interference related to the neighboring cell includes information on a plurality of neighboring cells, and wherein the maximum allowable interference power is determined based on a minimum value of maximum allowable interference power values for the plurality of neighboring cells that are greater than or equal to a threshold.

7. The method of claim 1, wherein the information on the interference related to the neighboring cell includes information on a plurality of neighboring cells, and wherein the maximum allowable interference power is determined based on an average value of maximum allowable interference power values for the plurality of neighboring cells.

8. A user equipment (UE) configured to operate in a wireless communication system, the UE comprising:
 a transceiver; and
 a processor operatively connected to the transceiver, wherein the processor is configured to:
 control the transceiver to receive, from a serving cell, information on transmission power related to the serving cell and information on interference related to a neighboring cell;
 determine uplink transmission power based on the information on the transmission power related to the serving cell and the information on the interference related to the neighboring cell, wherein the uplink transmission power is determined based on a minimum value of (1) maximum transmission power of the UE, (2) transmission power based on the information on the transmission power related to the serving cell, and (3) maximum allowable interference power based on the information on the interference related to the neighboring cell; and
 control the transceiver to transmit an uplink signal to the serving cell based on the uplink transmission power.

9. The UE of claim 8, wherein the information on the interference related to the neighboring cell includes information on a plurality of neighboring cells, and wherein the maximum allowable interference power is determined based on a minimum value of maximum allowable interference power values for the plurality of neighboring cells.

10. The UE of claim 8, wherein the maximum allowable interference power is determined based on target received interference power of the neighboring cell and a path loss from the UE to the neighboring cell.

11. The UE of claim 9, wherein the plurality of neighboring cells are selected in descending order of proximity to the UE, in descending order of reference signal received power (RSRP), or in ascending order of path loss values.

12. The UE of claim 10, wherein the target received interference power of the neighboring cell is broadcast by the serving cell.

13. The UE of claim 8, wherein the information on the interference related to the neighboring cell includes information on a plurality of neighboring cells, and wherein the maximum allowable interference power is determined based on a minimum value of maximum allowable interference power values for the plurality of neighboring cells that are greater than or equal to a threshold.

14. The UE of claim 8, wherein the information on the interference related to the neighboring cell includes information on a plurality of neighboring cells, and wherein the maximum allowable interference power is determined based on an average value of maximum allowable interference power values for the plurality of neighboring cells.

15. The UE of claim 8, wherein the UE is configured to communicate with at least one of a mobile terminal, a network, or an autonomous driving vehicle other than a vehicle including the UE.

* * * * *